Figure 1:
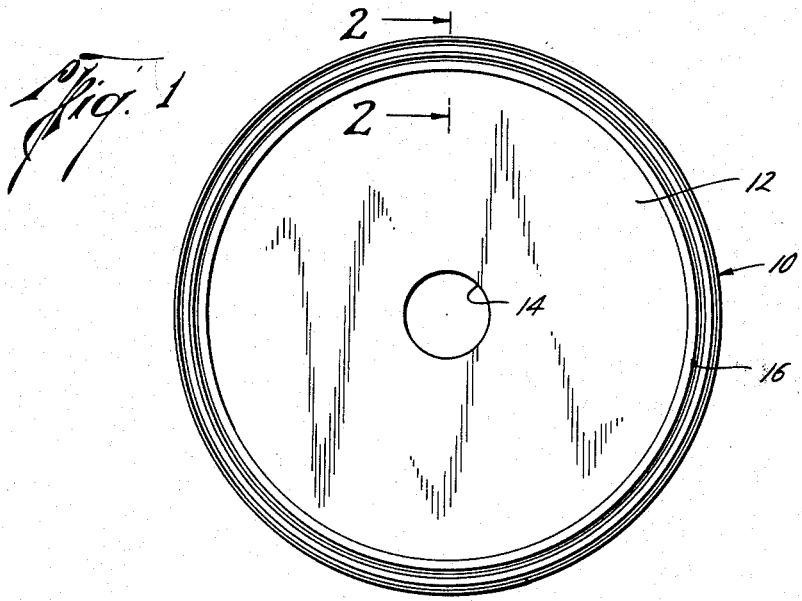

April 6, 1965   H. H. HODGEMAN ETAL   3,176,723
INTEGRAL ORIFICE PLATE AND METAL SEAL
Filed Dec. 7, 1962

Herbert H. Hodgeman
Philip E. Slaughter
INVENTORS

BY
ATTORNE

3,176,723
INTEGRAL ORIFICE PLATE AND METAL SEAL
Herbert H. Hodgeman and Philip Edward Slaughter, Houston, Tex., assignors to Daniel Orifice Fitting Company, Houston, Tex., a corporation of Texas
Filed Dec. 7, 1962, Ser. No. 243,002
3 Claims. (Cl. 138—44)

The present invention relates to a meter orifice plate and integral metal seal, and more particularly relates to an improvement in a metal orifice plate and seal which may be inserted in a pipe for measuring fluid flow therethrough.

In the past, orifice plates have been inserted into a gap in a pipe line and provided with seals, such as rubber and various types of plastics, in the gap for insuring that all of the fluid flow will pass through the orifice whereby the orifice plate will provide an accurate indication of the fluid flow.

However, in some fluid flow measurements, the present seals will not withstand the high temperatures required for some uses, for example in steam measurements, and have not satisfied the requirement that they provide long service life, such as two or three years, without failure. It is to overcome these disadvantages that the present invention is directed.

It is therefore a general object of the present invention to provide a metal orifice plate having an integral metal seal.

A still further object of the present invention is the provision of an integral orifice plate and metal seal wherein the seal has an annular arm protruding outwardly from the plate and a flexible metal lip projecting from the arm and positioned to contact the end of the pipe into which the orifice plate is inserted whereby a pressure chamber is formed behind the lip for urging the lip into a sealing engagement with the pipe end.

It is yet a further object of the present invention to provide an integral metal seal on an orifice plate which includes a resilient metal lip projecting by a first end from the plate and positioned to engage the end of a pipe into which the orifice plate is inserted with the second end of the lip being positioned a greater distance from the plate than the first end thereby providing a resilient metal seal.

It is yet a further object of the present invention to provide an improved resilient metal seal wherein the outer end of the sealing lip includes a tapering face to aid in moving the resilient seal into a pipe.

Yet a further object of the present invention is the provision of a resilient metal seal integrally made on an orifice plate which includes a recess in its face which traps fluid and provides a shear resistent seal.

A still further object of the present invention is the provision of an integral orifice plate and metal seal which includes an annular arm protruding outwardly from the orifice plate and a resilient metal lip projecting from the arm wherein the arm is provided with a shoulder at its outer extremity and the arm protrudes from the orifice plate at such an angle that the shoulder will stop the inward movement of the resilient lip when the orifice plate is inserted into a pipe so as to prevent the metal lip from being deformed beyond its elastic limit.

Figure 2:
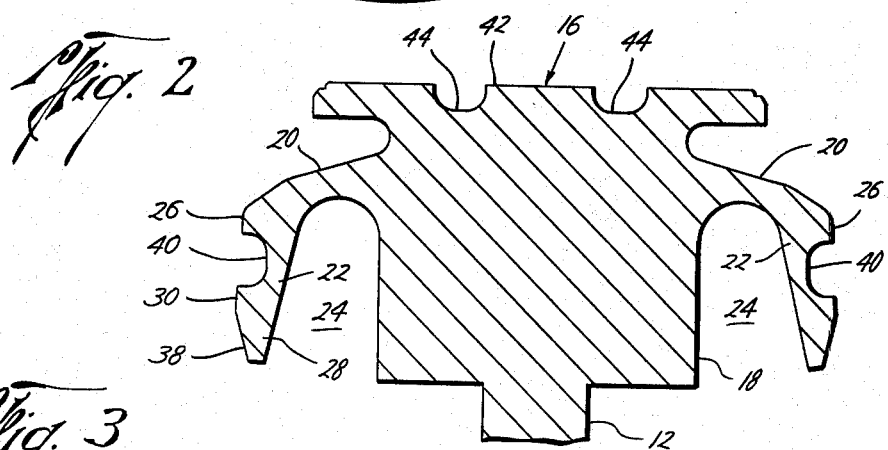
Figure 3:
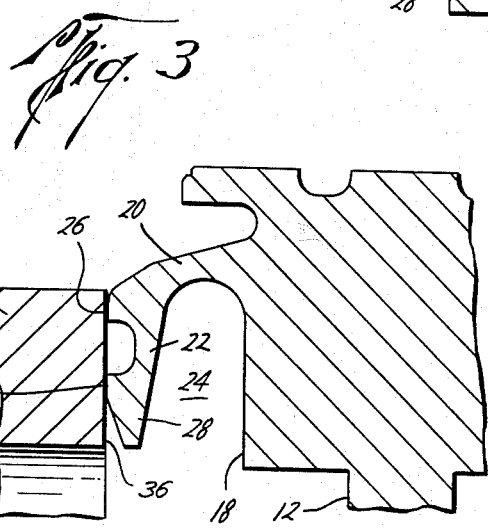

Other and further objects, features and advantages will be apparent from the following description of a presently preferred embodiment of the invention, given for the purpose of disclosure, and taken in conjunction with accompanying drawing where like character references designate like parts throughout the several views, and where FIGURE 1 is an elevational view, illustrating the integral orifice plate and metal seal of the present invention, FIGURE 2 is a cross-sectional view taken along the line 2—2 of FIGURE 1 showing the outer edge of the integral orifice plate in a position outside of a pipe, and FIGURE 3 is a fragmentary cross-sectional view, illustrating the position of the metal seal of the orifice plate in position against and sealing against the end of a pipe.

Generally, an orifice plate is carried by a suitable plate carrier which is adapted to move the orifice plate into and out of a gap in a pipe whereby the orifice plate will measure the flow of fluid to the pipe when it is positioned therein. Patent No. 2,407,951, No. 3,079,796 and No. 3,105,384, disclose suitable apparatus for moving an orifice plate into position in a gap between the ends of pipe for suitably measuring the fluid flow therethrough. While these mechanisms all disclose a housing which encloses the orifice plate and the pipe gap and thus prevents loss of fluid from the pipe line to the outside, it is noted that a seal formed of rubber, plastic or other flexible material is provided to prevent passage of fluid flow around the outer periphery of the orifice plate which would therefore bypass the orifice plate and give inaccurate measurements of the fluid flow in the pipe.

The present invention is directed to an improvement in the orifice plate and sealing arrangement by providing an integral metal orifice plate and seal which will withstand temperatures and operating conditions which the orifice plates in the past have been unable to do. In general, the orifice plate 10 of the present invention, as best seen in FIGURE 1, includes a metal plate 12, a conventional orifice plate measuring opening 14 in the center thereof, and an integral metal seal 16 on the sides adjacent the outer periphery of the orifice plate 12.

Referring now to FIGURE 2, the integral metal seal is best seen in its normal expanded position when it is not in place in a pipe gap. The seal 16 may include a seal body 18 connected to the orifice plate 12 and includes annular arms 20 projecting outwardly from body 18, and resilient metal lips 22 projecting from each annular arm in a direction parallel to the plane of the orifice plate 12. It is noted that the lips 22 form a chamber 24 with the body 18 behind the lips 22 so that when the orifice plate and seal are in position in a line the pressure in the line will be in communication with the chambers 24 thereby acting to urge the lips 22 outwardly and into a sealing engagement with the ends of the pipe.

The arms 20 protrude outwardly from the body 18 and an engaging shoulder 26 is provided thereon for engaging and resiliently contacting the end of a pipe. The resilient metal lips 22 are connected to the outer ends of one of the annular arms 20 with the lip ends 28 being positioned a greater distance from the plate 12 than the lip ends which are connected to the arm 20. A sealing shoulder 30 on the resilient metal lip 22 is thus positioned a greater distance from the plate 12 than the shoulder 26 on the annular arm 20. By means of illustration and as an example only, the plane of the shoulder 30 may be inclined to the plane of a shoulder 26 by a small angle such as 3°. Thus, and referring to FIGURE 3, when the orifice plate and seal is positioned in a gap between two ends of pipe the flexible lips 28 will be resiliently pressed against the ends of a pipe 32 thereby providing a resilient metal seal by the engaging and sealing shoulders 26 and 30 against the ends 36 of the pipe 32.

The axis of the annular arm 20 is provided to project at such an angle from the plane of the plate 12 that the engaging shoulder 26 will stop the inward movement of the flexible lip 22 before the metal lips 22 and annular arms 20 are deformed beyond their elastic limits when the orifice plate 10 is inserted in a pipe gap. By way of illustration, and by example only, the axis of the annular arm 20 may be positioned approximately 70° from the plane of the plate 12.

Since the ends 28 of the lips 22 in their normal position project outwardly further than the ends 36 of the pipe 32, a tapered or beveled face 38 is provided on the outside of the ends 28 of the resilient lips 22. Thus, as the orifice plate and seal 10 are inserted perpendicularly to the axis of the pipe 32 into a gap between the ends of the pipe, the tapered faces 38 will contact the ends 36 of the pipe 32 and will allow the transverse movement of the integral orifice plate 10 into position.

In addition, a recess 40 is provided in each of the resilient lips 22 which when in the sealing position of FIGURE 3 will trap fluid and provide a fluid seal which provides a shear resistance thereby increasing the sealing of the lips 22 against the ends of the pipe 32.

A conventional annular holding shoulder 42 is provided about the outer periphery of the orifice plate 10 for conventionally holding the orifice plate in any suitable plate carrier. Suitable recesses 44 may be provided, if desired, for providing conventional sealing rings (not shown).

In operation, the integral orifice plate and seal 10 of the present invention may be made of any suitable metal, such as stainless steel, and may be suitably positioned in a line in which it is desired to measure the fluid flow. Any suitable mechanism for inserting and/or removing the apparatus 10 from the line may be provided such as disclosed in the previously mentioned patents. As the orifice plate 10 is moved transversely to the pipe line 32 and into position for measuring the fluid flow with the conventional orifice 14, the tapered faces 38 on the outer extremities of the now expanded resilient lips 22 contact the ends 36 of the pipe 32 whereby the lips 22 are yieldably pushed inwardly as the orifice plate 10 is moved into place. Because of the resilience of the lips 22, and to a lesser extent, of the annular arms 20, the engaging shoulders 26 and the sealing shoulders 30 engage and seal against the ends 36 of the pipe 32. In addition, pressure in the pipe line is communicated to the chambers 24 behind the flexible lips 22 and urge the lips into a sealing engagement with the ends of the pipe 32. The recesses 40 in the lips 22 trap the pipe fluid therein which provides an additional seal which has a fluid shear resistance and thereby increases the sealing action of the lips 22. And as previously mentioned, the engaging shoulders 26 stop the inward flexing movement of the resilient lips 22 and annular arms 20 before these members are deformed beyond their elastic limits.

While the sealing structure, the annular arms 20 and the resilient lips 22 are shown on both sides of the orifice plate 12, it is actually only necessary to have the sealing structure on the downstream side of the orifice plate 12 as the force of the fluid passing through the pipe will urge the orifice plate 10 and according the seals downstream to provide a sufficient sealing shoulder against the downstream end of the pipe 32. The orifice plates are generally enclosed in a housing, as shown in the previously mentioned patents, and the purpose of the orifice plate seal is primarily to prevent the passage of fluid from the pipe around the orifice plate and back into the pipe line thereby bypassing the measuring orifice 14. Of course, in many applications, sealing on each side of the orifice is desirable, particularly in transfer fittings where the orifice plates are frequently changed for placing different sized orifice plates in the line.

The present invention therefore, is well adapted to carry out the objects and attain the ends and advantages mentioned as well as others inherent therein. While a presently-preferred embodiment of the invention is given for the purpose of disclosure, numerous changes in the details of construction and arrangement of parts may be made which will readily suggest themselves to those skilled in the art and which are encompassed within the spirit of the invention and the scope of the appended claims.

What is claimed is:

1. An integral orifice plate and metal seal for insertion into a gap between ends of a pipe for measuring fluid flow in the pipe comprising,
   a circular metal plate having an orifice,
   a metal seal integrally connected to the outer periphery of said plate including,
   an annular arm protruding outwardly from each side of the plate,
   a shoulder provided at the outer extremity of said arm and positioned to contact an end of the pipe when the orifice plate is inserted into said pipe gap,
   a flexible metal lip projecting from said arm inwardly in a direction substantially parallel to the plate,
   the outer end of said lip being positioned a greater distance from the plate than said arm and positioned to sealingly engage the end of the pipe when the orifice plate is inserted in said pipe gap, and
   a tapering face at the outer extremity of said lip whereby said lip may be easily moved into the gap.

2. The invention of claim 1 including a recess in the flexible lip to provide a seal against the pipe end.

3. An integral one-piece orifice plate and metal seal for movement into and out of a gap between ends of a pipe for measuring fluid flow in the pipe comprising,
   a circular metal plate having an orifice,
   a resilient metal seal integrally connected to the outer periphery of said plate on the downstream side of said plate including,
   an annular arm protruding outwardly from the plate,
   a shoulder provided at the outer extremity of said arm and positioned to contact the pipe when the orifice plate is inserted in the said pipe gap, and
   a resilient metal lip projecting from said shoulder inwardly in a direction substantially parallel to the plate, and
   the outer end of said lip being positioned a greater distance from the plane of the plate than said shoulder and positioned to engage the end of the pipe when the orifice plate is inserted in said pipe gap thereby providing a resilient metal seal,
   the outer end of said lip including a tapered face allowing the lip to be moved into the pipe gap.

References Cited by the Examiner

UNITED STATES PATENTS

| 2,407,951 | 9/46 | Daniel | 138—44 |
| 2,547,185 | 4/51 | Von Bolhar | 277—206 |
| 3,003,795 | 10/61 | Lyon | 285—212 |

FOREIGN PATENTS

| 511,330 | 3/55 | Canada. |
| 869,720 | 2/42 | France. |
| 563,738 | 11/32 | Germany. |

EDWARD V. BENHAM, *Primary Examiner.*

LEWIS J. LENNY, *Examiner.*